United States Patent [19]

Herlihy et al.

[11] Patent Number: 5,428,761
[45] Date of Patent: Jun. 27, 1995

[54] SYSTEM FOR ACHIEVING ATOMIC NON-SEQUENTIAL MULTI-WORD OPERATIONS IN SHARED MEMORY

[75] Inventors: Maurice Herlihy, Brookline; J. Eliot B. Moss, Amherst, both of Mass.

[73] Assignee: Digital Equipment Corporation, Maynard, Mass.

[21] Appl. No.: 849,887

[22] Filed: Mar. 12, 1992

[51] Int. Cl.$^6$ .............................................. G06F 12/00
[52] U.S. Cl. ............................... 395/425; 364/DIG. 1; 364/228.1; 364/243; 364/243.4; 364/243.41; 364/246.6; 364/246.8
[58] Field of Search ....................... 395/425, 400, 800; 371/421

[56] References Cited

U.S. PATENT DOCUMENTS

| | | | |
|---|---|---|---|
| 4,142,234 | 2/1979 | Bean et al. | 395/425 |
| 4,551,799 | 11/1985 | Ryan et al. | 395/425 |
| 4,695,951 | 9/1987 | Hooker et al. | 395/800 |
| 5,067,078 | 11/1991 | Talgam et al. | 395/400 |
| 5,119,485 | 6/1992 | Ledbetter, Jr. et al. | 395/425 |
| 5,133,058 | 7/1992 | Jensen | 395/400 |
| 5,155,824 | 10/1992 | Edenfield et al. | 395/425 |
| 5,164,944 | 11/1992 | Benton et al. | 371/40.1 |
| 5,206,941 | 4/1993 | Eikill et al. | 395/425 |
| 5,265,235 | 11/1993 | Sindhu et al. | 395/725 |
| 5,276,828 | 1/1994 | Dion | 395/425 |
| 5,276,835 | 1/1994 | Mohan et al. | 395/425 |
| 5,287,473 | 2/1994 | Mohan et al. | 395/425 |

OTHER PUBLICATIONS

Banatre et al, Cache management in a tightly-coupled fault tolerant multiprocessor, FTCS 20, 1990, pp. 89–96.

Primary Examiner—Rebecca L. Rudolph
Attorney, Agent, or Firm—Arthur W. Fisher; Denis G. Maloney

[57] ABSTRACT

A computer system provides transactional memory operations, in which a selected data item in a shared memory is referenced by a CPU in local storage (such as a write-back cache). The CPU performs some operation to alter or use the data item while it is in local memory, and meanwhile monitors the bus to the shared memory to see if another processor references the selected location (as by a snoop mechanism); if so, a status bit is toggled to indicate that the transaction must be scrubbed. When the operation has been completed by the CPU, it attempts to "commit" the transaction, and this includes checking the status bit; if the bit has been toggled, the transaction aborts, the data item is invalidated in local memory, and the selected location in shared memory is not affected. If the status bit has not been toggled, the transaction is committed and the altered data item becomes visible to the other processors, and may be written back to the shared memory. To distinguish these transactional memory operations from standard loads and stores to memory, an indication of "transactional" or "not transactional" is added to the local storage, i.e., to a cache line. The transactional memory operations have the characteristics of serializability and atomicity.

28 Claims, 2 Drawing Sheets

| OPERATION | MEANING |
|---|---|
| r = LOAD(x) | READS VALUE OF LOCATION x INTO REGISTER r. |
| STORE(x,v) | WRITES v TO LOCATION x. |
| r = LT(x) | READS VALUE OF LOCATION x INTO REGISTER r FOR TRANSACTION. |
| ST(x,v) | WRITES v TO LOCATION x FOR TRANSACTION. |
| r = LTX(x) | READS VALUE OF LOCATION x INTO REGISTER r FOR TRANSACTION. |
| r = COMMIT( ) | TRIES TO COMMIT CURRENT TRANSACTION, RETURNING SUCCESS CODE. |
| ABORT( ) | ABORTS CURRENT TRANSACTION. |
| r = VALIDATE( ) | RETURNS CURRENT TRANSACTION STATUS. |

FIG.2

SYSTEM FOR ACHIEVING ATOMIC NON-SEQUENTIAL MULTI-WORD OPERATIONS IN SHARED MEMORY

BACKGROUND AND SUMMARY OF THE INVENTION

This invention relates to operation of computer systems having shared memory, and more particularly to a transactional memory for use in multiprocessor systems.

Synchronizing access to shared data structures is one of the oldest and most difficult problems in designing software for shared-memory multiprocessors. Without careful synchronization, a data structure may be left in an inconsistent state if different processes try to modify it at the same time. Conventional techniques for synchronizing access to shared data structures in shared-memory multiprocessors center around mutual exclusion protocols. Each data structure has an associated lock. Before a process can access a data structure, it must acquire the lock, and as long it holds that lock, no other process may access the data structure.

Nevertheless, locking is poorly suited for modern shared-memory multiprocessor architectures, for several reasons. First, locking is poorly suited for processes that must modify multiple data objects, particularly if the set of objects to be modified is not known in advance. Care must be taken to avoid deadlocks that arise when processes attempt to acquire the same locks in different orders. Second, if the process holding a lock is descheduled, perhaps by exhausting its scheduling quantum, by a page fault, or by some other kind of interrupt, then other processes capable of running may be unable to progress. Third, locking interacts poorly with priority systems. A lower-priority process may be preempted in favor of a higher-priority process, but if the preempted process is holding a lock, then other, perhaps higher priority processes will be unable to progress (this phenomenon is sometimes called "priority inversion"). And fourth, locking can produce "hot-spot" contention. In particular, spin locking techniques, in which processes repeatedly poll a lock until it becomes free, perform poorly because of excessive memory contention.

By contrast, a concurrent object implementation is non-blocking if some process is guaranteed to complete an operation after the system as a whole takes a finite number of steps (referred to as atomicity, as will be described). This condition rules out the use of locking, since a process that halts while holding a lock may force other processes trying to acquire that lock to run forever without making progress.

Described herein is a new multiprocessor architecture that permits programmers to construct non-blocking implementations of complex data structures in a simple and efficient way. This architecture is referred to as transactional memory, and consists of two parts: (1) a collection of special machine instructions, and (2) particular techniques for implementing these instructions.

Most of the programming language constructs proposed for concurrent programming in the multiprocessor with shared memory model employ locks, either explicitly or implicitly (Andrews et al, "Concepts and notations for concurrent programming," ACM Computing Surveys, Vol. 15, No. 1, pp. 3–43, March 1983, disclose a survey). Early-locking algorithms used only load and store operations, as disclosed in Dijkstra, "Co-operating sequential processes," pp. 43–112, Academic Press, New York, 1965, in Knuth, "Additional comments on a problem in concurrent programming control," Communications of the ACM, Vol. 9, No. 5, pp. 321–322, May 1966, in Peterson, "Myths about the mutual exclusion problem," Information Processing Letters, Vol. 12, pp. 115–116, June 1981, and in Lamport, "A new solution of Dijkstra's concurrent programming problem," Communications of the ACM, Vol. 18, No. 8, pp. 453–455, August 1974.

These algorithms using only load and store operations, however, are cumbersome and inefficient, so current practice is to provide support for read-modify-write (RMW) operations directly in hardware. A read-modify-write operation is parameterized by a function f. It atomically (1) reads the value v from a location, (2) computes f(v) and stores it in that location, and (3) returns v to the caller. Common read-modify-write operations include TEST&SET, atomic register-to-memory SWAP (see Graunke et al, "Synchronization algorithms for shared memory multiprocessors," IEEE Computer, Vol. 23, No. 6, pp. 60–70, June 1990), FETCH&ADD (see Gottlieb et al, "The NYU Ultracomputer—designing an MIMD parallel computer," IEEE Trans. on Computers, Vol. C-32, No. 2, pp. 175–189, February 1984), COMPARE&SWAP (see IBM, "System/370 principles of operation," Order No. GA22-7000), and LOAD_LINKED and STORE_CONDITIONAL (see Jensen et al, "A new approach to exclusive data access in shared memory multiprocessors," Technical Report UCRL-97663, Lawrence Livermore National Laboratory, November 1987).

Although these hardware primitives were originally developed to support locking, they can sometimes be used to avoid locking for certain data structures. A systematic analysis of the relative power of different read-modify-write primitives for this purpose is given in Herlihy, "Wait-free synchronization," ACM Trans. on Programming Languages and Systems, Vol 13, No. 1, pp. 123–149, January 1991. If an architecture provides only read and write operations, then it is provably impossible to construct non-blocking implementations of many simple and familiar data types, such as stacks, queues, lists, etc. Moreover, many of the "classical" synchronization primitives such as TEST&SET, SWAP, and FETCH&ADD are also computationally weak. Nevertheless, there do exist simply universal primitives from which one can construct a non-blocking implementation of any object. Examples of universal primitives include COMPARE&SWAP, LOAD_LINED and STORE_CONDITIONAL, and others.

Although the universal primitives are powerful enough in theory to support non-blocking implementations of any concurrent data structure, they may perform poorly in practice because they can update only one word of memory at a time. To modify a complex data structure, it is necessary to copy the object, modify the copy, and then to use a read-modify-write operation to swing a base pointer from the old version to the new version. Detailed protocols of this kind for COMPARE&SWAP and for LOAD_LINED and STORE_CONDITIONAL have been published (see Herlihy, "A methodology for implementing highly concurrent data structures," Proc. 2nd ACM SIGPLAN Symp. on Princ. and Practice of Parallel Programming, pp. 197–206, March 1990, and Herlihy, "A methodology for implementing highly concurrent data objects," Tech. Rpt. No. 91/10, Digital Equipment Corporation, Cambridge Research Laboratory, Cambridge, Mass. 02139, October 1991). One exception to the single-word limitation is the Motorola 68030 architecture, which provides a two-word COMPARE&SWAP instruction. Masselin and Pu exploit this primitive to construct an operating system kernel that employs a number of non-blocking data structures.

In copending application Ser. No. 547,618, filed Jun. 29, 1990, by Sites and Witek, for "Ensuring Data Integrity in Multiprocessor or Pipelined Processor," assigned to Digital Equipment Corporation, a processor of a 64-bit RISC architecture is disclosed. Atomic byte writes are implemented by providing load/locked and store/conditional instructions. To write to a byte address in a quadword aligned memory location, the processor loads a quadword, performs an internal byte write in the processor's register set, then conditionally stores the updated quadword in memory, depending upon whether the quadword has been written by another processor since the load/locked operation. As with the conditional stores discussed above, this operation is limited to a fixed-size memory reference, and does not provide the full range of functions needed for the transactional memory of the present invention.

Transactional memory according to this invention improves on these primitives by effectively providing the ability to implement customized read-modify-write operations that affect arbitrary regions of memory. This ability avoids the need for copying imposed by the single-word primitives, since complex atomic updates can now be applied in place. Moreover, since the number of locations affected by a transaction is limited only by processor cache size, transactional memory is strictly more flexible than two-word COMPARE&SWAP.

A second feature of transactional memory is its close integration with cache consistency protocols. There are several ways read-modify-write instructions may interact with the cache. Perhaps the simplest is to bypass the cache entirely, locking the bus for several cycles while making updates directly to memory. (Some of these protocols invalidate any cached copies of that location, while some do not.) As described in the survey article by Glew and Hwu, "A feature taxonomy and survey of synchronization primitive implementations," Technical Report CRHC-91-7, Univ. of Illinois at Urbana-Champagne, 1101 W. Springfield, Urbana, Ill. 61801, December 1990, this approach is taken by the BBN TC2000, by the early version of the EncOre Multimax, by the Motorola MC68030, by Pyramid, by the VAX 6200, and others. Locking the bus is clearly unsuitable for transactional memory.

A more sophisticated approach is to cache an exclusive copy of a memory location and to prevent other processors from acquiring that value while the read-modify-write is in progress. This technique is used by the Berkeley Protocol (see Katz et al, "Implementing a cache consistency protocol," Proc. 12th Annual Int'l Symp. on Computer Architecture, pp. 276-286, IEEE, June 1985), by the Sequent Symmetry (see Graunke et al, cited above), by the later version of the Encore MultiMax, and by the SPUR processor (the last two as described in Clew and Hsu, cited above). This technique is essentially equivalent to locking. It works well for predefined read-modify-write instructions, where the duration of locking is fixed in advance, but it is not suitable for transactional memory, where there may be an arbitrarily long interval between reading a location and modifying it.

The S1 project (see Jensen et al, cited above) uses a kind of cache invalidation scheme to implement LOAD_LINKED and STORE_CONDITIONAL synchronization primitives. When a process executes a LOAD_LINKED, it effectively caches the variable in exclusive mode. The STORE_CONDITIONAL will succeed only if that entry has not been invalidated. The transactional memory implementation, according to the invention, in contrast, is applied to multiple memory locations, and to a large class of cache consistency protocols.

The notion of a transaction, in the sense of a sequence of operations executed atomically with respect to other transactions, has been used in database technology. Many techniques have been proposed for synchronizing transactions. Although the properties provided by transactional memory have some similarity to the properties provided by database transactions, there are important differences. Most mechanisms for synchronizing database transactions are based on some form of locking (e.g., as described by Eswaran et al, "The notion of consistency and predicate locks in a database system," Communications of the ACM, Vol. 19, No. 11, pp. 624-633, November 1976, by Moss, "Nested transactions: An approach to reliable distributed computing," Technical Report MIT/LCS/TR-260, M.I.T. Laboratory for Computer Science, April 1981, and by Reed, Implementing atomic actions on decentralized data," ACM Trans. on Computer Systems, Vol. 1, No. 1, pp. 2-23, February 1983). The database mechanisms that most closely resemble transactional memory are optimistic techniques (as described by Kung et al, "On optimistic methods for concurrency control," ACM Trans. on database Systems, Vol. 2, No. 6, pp. 213-226, June 1981) in which transactions execute without synchronization, but each transaction must be validated before it is allowed to commit. The techniques for validating transactions are entirely different in a transactional memory, however. The database techniques rely on software validation, while in a transactional memory validation is integrated with the multiprocessor's cache consistency protocol.

BRIEF DESCRIPTION OF THE DRAWINGS

The novel features believed characteristic of the invention are set forth in the appended claims. The invention itself, however, as well as other features and advantages thereof, will be best understood by reference to the detailed description of a specific embodiment, when read in conjunction with the accompanying drawings, wherein:

FIG. 2 is a table of transactional instructions used in a computer system such as that of FIG. 1;

FIG. 3 is a program listing in C for implementing a FIFO using transactional memory and transactional instructions of FIG. 2.

DESCRIPTION OF PREFERRED EMBODIMENTS

Figure 1:
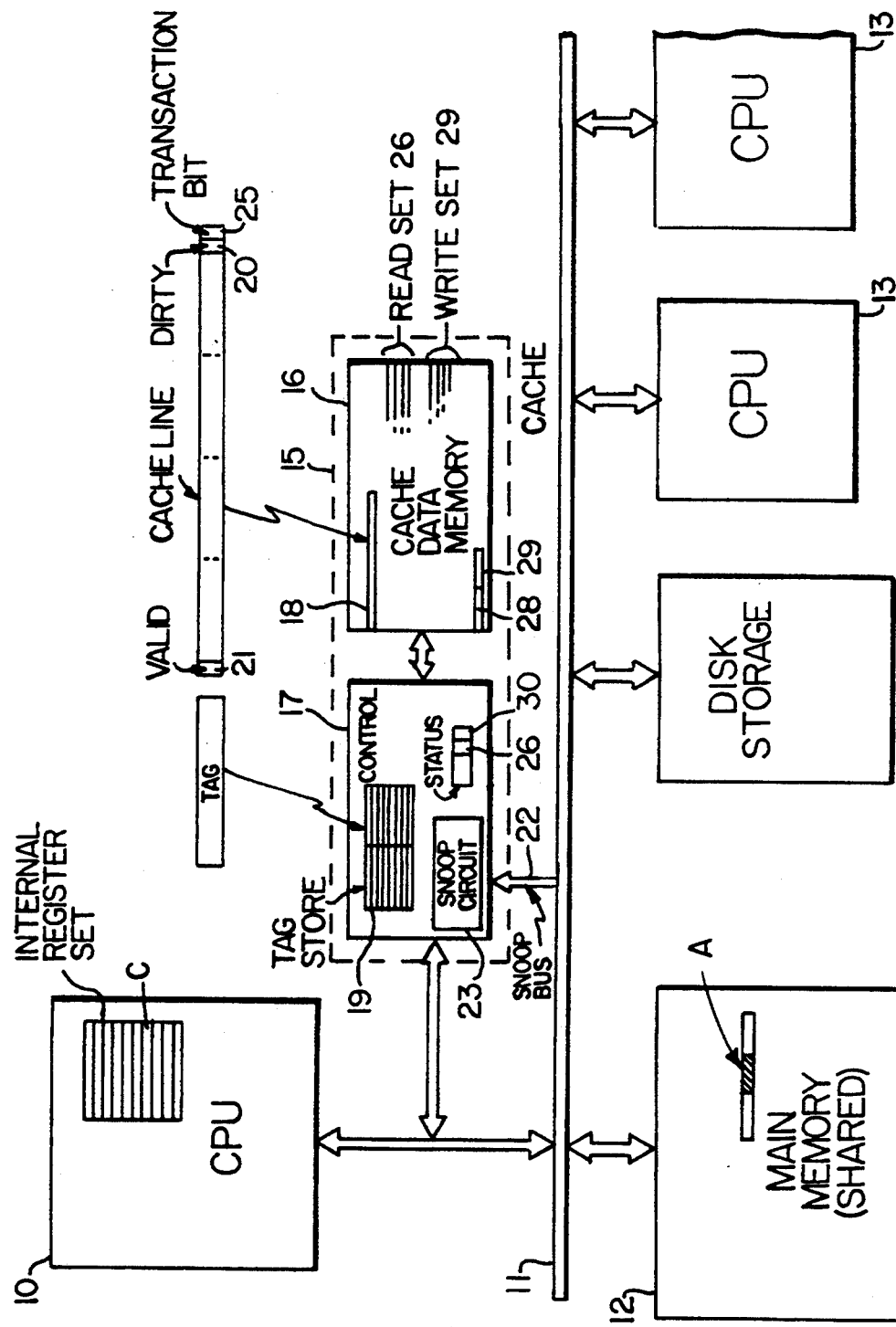
FIG. 1 is an electrical diagram in block form of a computer system which may employ transactional memory according to one embodiment of the invention.

Referring to FIG. 1, a computer system employing transactional memory is illustrated according to one example embodiment. A CPU 10 is coupled by a system bus 11 to main memory 12, and other CPUs 13 as well as system resources such as disk storage, etc., are also accessing the main memory 12 via the system bus. The problem arising in a multiprocessor system such as this, with shared memory, is that the CPU 10 can start a transaction involving a location A in main memory, then one of the other CPUs 13 may write to the location A before CPU 10 has completed its transaction. For example, the CPU 10 may wish to add a number B to the contents of location A (e.g., A may be a counter maintaining an account balance). To accomplish this transaction, CPU 10 first reads the value at location A into an internal register C, then adds the value B to register C, then writes the contents of C to the location A in memory 12. The problem is, another CPU 13 may be doing the same type of transaction at about the same time, and writes to location A after CPU 10 has read location A but before CPU 10 has rewritten its completed result to A. In such case, the data at A is corrupted. Both CPUs have attempted to modify A, but the modification made by CPU 13 is overwritten by the later write by CPU 10.

To avoid the multiprocessor problem, 'the memory of the system of FIG. 1 can be constructed to operate in a transactional manner, according to one embodiment. The transactional memory has a number of elements in common with a conventional system using a cache, which will first be described as background. The system has a cache 15, including a cache memory 16 operated by a cache controller 17, in the usual manner. The cache 15 may be a secondary cache, with an on-chip primary cache being included in a single-chip processor device used as the CPU 10, in a typical construction. Data is stored in the cache memory 16 in a number of cache lines 18, where each line may be 128-bits, or 256-bits, etc., depending upon the architecture and partitioning of the system. The cache controller 17 includes a tag memory 19 storing a tag for each cache line 18, and, in the usual manner, the address of a read or write request by the CPU 10 is compared with the tag memory 19 to see if the request can be satisfied in the cache; if not the request is forwarded to main memory 12. When the CPU 10 writes to a location in a cache line 18 in cache 15, then the corresponding location in main memory 12 is no longer consistent, so a write-back or write through scheme must be implemented. Assuming that this is a write-back cache, each cache line 18 will have a "dirty" bit 20, which is set by the cache controller when the CPU 10 writes to a location in the line. Each line 18 also has a "valid" bit 21, indicating whether or not this line is valid. A so-called "snoop bus" 22 monitors the system bus 11 and compares the address used on any write transaction emanating from one of the other CPUs 13 to alter the memory 12. Whenever this address matches a tag in the tag memory 19, the valid bit 21 for this line is reset, indicating this line is no longer valid. Whenever the address of a read request on bus 11 monitored by the snoop bus 22 matches a tag in tag memory 19 for which the dirty bit 20 is set, this indicates that the location in main memory is not up to date and so the read is prevented from taking place until this dirty (written by CPU 10) line in cache is written back to memory 12. A write back is executed whenever some other CPU needs the data at the location, or whenever the line is moved out of the cache 15. The snoop bus 22 and snoop circuit 23 in the cache controller 17 is thus able to detect reads or writes to locations in memory 12 by monitoring the addresses and read/write control signals on the bus 11; this ability is used in implementing the transactional memory.

In addition to the cache operation with invalidate and dirty bits for each cache line, and the snoop operation, other functions are added to the cache 15 to facilitate transactional operation. A transaction bit 25 is stored for each cache line 18, and this transaction bit is set whenever data in this line is involved in a transaction operation. When the transaction is completed, successfully or not, the transaction bit is reset. Another element added is a transaction status bit 26 in the cache controller, which indicates whether a currently-executing transaction is healthy or not. This bit 26 is set when a transaction is started, and remains set unless something happens that indicates that the transaction cannot successfully complete, e.g., another CPU reads from or writes to the location in memory 12 involved in the transaction. Thus, the status bit 26 is operated by an output from the snoop circuit 23; the status bit 26 is reset, indicating a failed transaction, whenever the following kinds of address match are detected: (1) a bus read from snoop bus 22 matches a tag in the tag memory 19, and the transaction bit 25 and dirty bit 20 are both set, or (2) the bus write from snoop bus 22 matches a tag and the transaction bit 25 is set. The CPU 10 can query this status bit 26, as by a read to a register location in the cache controller, to determine the status of a pending transaction.

Accordingly, using the system of FIG. 1, the example transaction mentioned above would proceed as follows, using this example embodiment of a transaction memory. First, the CPU 10 reads the location A and stores it in an internal register and thus in the cache memory 16 as a line 18 (or multiple lines). At the same time, the line 18 is marked as a transaction by setting the bit 25. As usual, the line is marked valid by setting the valid bit 21. Also, the status bit 26 is set. A transaction is thus initiated. Then, the CPU 10 does whatever activity is needed involving the data in this cache line, such as adding an amount B to a counter value defined in the location A which is now in the register and selected cache line 18. When the counter value is changed, the cache line's dirty bit is set. During this activity by CPU 10, the snoop bus is monitoring the bus 11 to see if another CPU either reads or writes the location A. If another CPU reads the location A, this will mean it will be getting data that is stale, since a transaction has already begun that would eventually change this data, even though the change may not yet have been made. Of course, if a write is done to location A, this indicates that the transaction cannot be properly completed. So, in either case the status bit 26 is reset, indicating the transaction is fatally defective. When the CPU 10 has finished its alteration of the location A data in its internal register set, it writes the result to cache 15, and is ready to end the transaction; the CPU first checks the status bit 26 (i.e., a "commit" operation as described below). If it finds the status bit 26 reset, the transaction is scrubbed, and begins again. That is, the CPU 10 will again read the value at location A into its cache 15, set the status bit 26 and transaction bit 25, and do the updating of the counter value as before. Whenever it completes its activity on the value from location A and finds the status bit 26 still set, the CPU makes the transaction visible to the other users of the memory 12 by clearing the transaction bit 25 and allowing a write back from cache 15 to memory 12 if another CPU 13 sends a read or write request for location A onto the bus 11.

A feature of the transactional memory operations described below is allowing a transaction to involve a memory area of some arbitrary size (no larger than the cache, however), rather than being limited to a word or the like. The size is referred to as the "read set or "write set," and these are recorded implicitly in the cache. A line is in the read set if the transactional bit 25 is set but the dirty bit 20 is not set, and is in the write set if both the transactional and dirty bits are set. The read set may be made up of non-contiguous areas of memory, as may the write set. A read set 28 is thus defined to be whatever cache lines currently meet the conditions of "bit 25 set, bit 20 not set," and the write set 29 is whatever cache lines have bits 20 and 25 both set.

Another element of hardware that may be helpful is a status bit 30 indicating whether or not a transaction completed. If the CPU 10 tries to commit a transaction as will be described, the bit 30 is set if it is successful, or reset if failure. Thus, the CPU 10 can check the bit 30 to see if the transaction completed so it can determine whether or not to repeat the transaction. Alternatively, of course, a "completed" signal may be sent to the CPU 10 from the cache controller 17, without the CPU making inquiry.

With this overview of a simplified example, transactional memory will be described in more generic terms.

A transaction is a finite sequence of machine instructions executed by a single process, satisfying the properties of serializability and atomicity. Serializability means that each transaction appears to take place instantaneously, in the sense that the steps of one transaction never appear to be interleaved with the steps of another. Atomicity means that each transaction makes a sequence of tentative changes to shared memory; when the transaction completes, it either commits, instantaneously making its changes visible to other processes, or it aborts causing its changes to be discarded.

In the example of FIG. 1, a transaction must be serializable so that once a transaction by the CPU 10 starts (e.g., adding to the value of the counter at location A), another operation involving the location A by another CPU 13 must not start or be active. Thus, each transaction appears to take place instantaneously, because if there is any overlap the transaction will be aborted. Also, a transaction has atomicity in that it doesn't reach a half-way condition; it either does the entire operation, or it does none of it (aborts).

In the transactional memory, transactions satisfy the same serializability and atomicity properties as in database technology, but are implemented using entirely different techniques, and their intended applications are entirely different. Unlike database transactions, in a transactional memory transactions are intended to be short-lived activities that access a relatively small number of memory locations. The ideal size and duration of transactions is implementation-dependent, but, roughly speaking, a transaction should be able to run to completion within a single scheduling quantum, and the set of variables it accesses should be small enough to fit in the processor's cache.

Transactional memory provides six primitive instructions as described in the following paragraphs:

(1) Load-transactional (LT) reads the value of a shared memory location into a private register (e.g., register C and cache 15). The set of locations read by LT is called the transactions's read set (e.g., set 28 of FIG. 1).

(2) Store-transactional (ST) tentatively writes the value in a private register (e.g., register C and cache 15) to a shared memory location (main memory 12). This new value in cache 15 does not become visible to other processors 13 until the transaction successfully commits (see below). The set of locations tentatively updated by ST is called the transaction's write set (e.g., set 29 of FIG. 1).

(3) Load-transactional-exclusive (LTX) reads the value of a shared memory location into a private register (e.g., register C and cache 15). Although this operation does not modify memory 12, the location read is considered part of the transaction's write set 29. LTX is more efficient than LT for reading locations that are likely to be modified.

(4) Commit (COMMIT) attempts to make the transactions's tentative changes permanent (e.g., write back is permitted to memory 12). It succeeds only if no other transaction has updated any location in the transaction's read or write set, and no other transaction has read any location in this transaction's write set (i.e., status bit 26 still set). If it succeeds, the transaction's changes to its write set become visible to other processes (transaction bit 25 is cleared and write-back permitted). If it fails, all changes to the write set are discarded. Either way, COMMIT returns an indication of success or failure (the status bit 30 or a signal).

(5) Abort (ABORT) discards all updates to the write set (e.g., invalidates the cache line holding location A data by resetting the valid bit 21 and clearing the transaction bit 25).

(6) Validate (VALIDATE) tests the current transaction status (status bit 26). A successful VALIDATE returns True, indicating that the current transaction may proceed. An unsuccessful VALIDATE returns False, indicating that the current transaction has aborted, and it discards the transaction's tentative updates (invalidates all cache lines with transactional bit 25 set).

These transactional instructions are summarized in FIG. 2. Here, LOAD and STORE are usually part of any processor's instruction set. The register r of FIG. 2 is in the CPU's internal register set in the FIG. 1 embodiment. These instructions may be implemented in any of several ways in a given platform (combination of CPU and operating system). First, the instructions of FIG. 2 may be part of an instruction set of a computer architecture. Second, the instructions may be macro instructions built up from the processor's native instruction set and reached by a trap or a so-called PALcode function, as set forth in said application Ser. No. 547,618, in which case the code to implement the transactional instructions is stored in firmware on the processor board, for example. Third, the transactional instructions may be implemented by the operating system, in which case the status bits 25, 26 and 30 may not actually be hardware but instead merely memory locations referenced by the software. Fourth, the transactional instructions might be implemented in an applications program, where again the status bits may be software defined. Of course, higher performance is obtained by implementing the transactional instructions using hardware for the status bits. Software implementations are more likely based on the directory model described below, rather than on the write-back cache with snoop bus model, because of the difficulty in simulating the invalidate-type functions without hardware support.

By combining these primitives of FIG. 2, the programmer has the ability to define customized read-modify-write operations that operate on arbitrary regions of memory, not just single words. Non-transactional instructions are also supported, such as LOAD and STORE, which do not affect a transaction's read and write sets.

Transactional memory implemented as in FIGS. 1 and 2 guarantees that (1) if a transaction by the CPU 10 aborts, then none of the values it wrote with ST instructions will be visible to other processors 13, and (2) if it commits, then its sequence of LT and ST instructions will not appear to be interleaved with any other committed transaction's sequence. The first property guarantees atomicity, and the second serializability. As described in more detail below, this property is implemented by aborting an active transaction if:

(1) any process applies a STORE to any location in its read or write sets 28 and 29,
(2) any process applies a LOAD to any location in its write set 29,
(3) another active transaction applies a ST to any location in its read or write sets 28 and 29, or
(4) another active transaction applies a LT to any location in its write set 29.

A transaction may also occasionally be aborted for implementation-specific reasons as described below.

The VALIDATE instruction is motivated by considerations of software engineering. A set of values in memory is inconsistent if it could not have been produced by any serial execution of transactions. An orphan is a transaction that continues to execute after it has been aborted (i.e., after another transaction has updated its read set). Under certain circumstances, it is impractical to guarantee that every orphan will observe a consistent read set. Although any such transaction will never commit, it may be difficult to ensure that a long or complex transaction, when confronted with unexpected input, does not store into out-of-range locations, divide by zero, or perform some other illegal action. The VALIDATE instruction addresses this problem by allowing programmers to ensure that values read are consistent before using them. A transaction is defined to be well-formed if it executes a VALIDATE instruction before computing with any value read by LT. A well-formed transaction will never observe an inconsistent read set, even if it becomes an orphan. For example, a simple well-formed transaction might:

(1) use a sequence of LT instructions to load its read set 28,
(2) use VALIDATE to ensure that the read set 28 is consistent,
(3) in the course of a computation, issue a sequence of ST instructions to update its write set 29, and
(4) call COMMIT to make these updates permanent.

A more complex transaction, such as one that chains down a linked list, might have to alternate LT and VALIDATE instructions. In the example implementation, the VALIDATE instruction is local—it does not generate any processor-to-processor or processor-to-memory traffic, but instead merely checks the status bit 26.

An exemplary embodiment of the invention, as shown in the attached Appendix A may be used to implement a concurrent FIFO queue using the transactional memory and instructions of FIG. 2. The Appendix A includes a listing of C-language programming lines, shown in order of execution. The Appendix A is hereby incorporated by reference in its entirety. The queue is a structure with three fields: enqs and deqs count the number of enqueues and dequeues that have occurred (these values can be kept bounded by careful use of modular arithmetic), and items is a fixed-size array of items. The body of the queue_deq operation is a loop that repeats until the operation's changes are committed. The operation reads the dequeue count, which is used to locate the head of the queue, and the enqueue count, which is used to check whether the queue is empty. Both counters are read using LTX to reduce the number of transaction aborts. The procedure then validates the values read, and if the queue is non-empty, it reads the value from the queue and tentatively updates the dequeue count. The queue_enq procedure has a similar structure as seen in FIG. 3.

A transaction is said to starve if it is never able to commit. For example, a dequeuer may starve if it is infinitely often overtaken by other dequeuers. Starvation is believed to be best handled at the software level. For example, adaptive backoff techniques proposed by Anderson (see "The performance of spin lock alternatives for shared-memory multiprocessors) and Graunke et al (cited above) to reduce contention can also be used to avoid starvation. Each time a transaction aborts, it waits for a random duration before trying again, doubling the expected delay each time. Operation combining is a deterministic technique for avoiding starvation in which transactions "help" other transactions by executing their operations (see Herlihy, ":A method for implementing highly concurrent data objects," cited above).

A method used to extend a certain class of cache consistency protocols to support the transactional memory primitives will now be described. Below are given detailed and specific protocols for a bus-based architecture and for an architecture employing an arbitrary interconnection network. Here, however, the basic principles are explained.

Standard cache consistency protocols fall into two classes as described by Smith. In write-through protocols, any modification to an entry in cache memory 16 immediately results in a modification to memory 12 (and to other cached copies, if they exist). In write-back protocols (also called copy-back), a CPU 10 may modify an entry in cache memory 16 in place, without making an immediate change to main memory 12. The focus here is on write-back protocols, which are the most common in practice. An entry in cache memory 16 is dirty (bit 20 is set) if it has been modified without updating main memory 12, and clean otherwise. Before a process can update a value, it must typically acquire exclusive access to that location, invalidating any cached copies held by other processors 13. Conversely, before a process can read an uncached location, it must acquire a shared copy of that value, revoking any exclusive access held by another processor.

Transactional memory is implemented by extending any standard write-back protocol in the following way. Using the bit 25, each cache entry is marked either transactional (TRANS) or non-transactional (TRANS), and using the dirty bit 20 an entry is marked either shared or exclusive (exclusive means the same as dirty, in that this processor has the only valid copy of this data). An entry cached by LT is marked shared and transactional, by ST exclusive and transactional, by LOAD shared and non-transactional, and by STORE exclusive and non-transactional. If a cache entry is marked exclusive and transactional, then that value is tentative, and will not be released to any other processor. In such a case, the protocol ensures that the previous (committed) value is either in memory or in another processor's cache.

Each processor has a transaction state, either ACTIVE or ABORTED, and in the embodiment of FIG. 1 this is the status bit 26. Initially, the transaction state is ACTIVE. It becomes ABORTED if any transactional cache entry is invalidated, as detected by the snoop circuit in the example of FIG. 1. Such invalidation can happen in several ways:

(1) If processor P writes to a location in processor Q's read or write set, then P acquires exclusive access to that location, invalidating Q's entry, and forcing Q's transaction to abort.

(2) If P reads a location in Q's write set, then it revokes Q's exclusive access, invalidating Q's entry and forcing Q's transaction to abort.

(3) If a non-transactional operation discovers that its operand is cached in transactional mode, it will invalidate that entry before proceeding. It is assumed that such a situation represents a programmer error.

(4) If a process empties its cache when it performs a context switch.

The COMMIT instruction tests the current transaction state. If it is ACTIVE, then the transaction commits, and its modifications are made visible to the other processes by marking them as non-transactional. If it is ABORTED, then the transaction aborts, and its modifications are discarded by invalidating all transactional cache entries. The VALIDATE instruction tests whether the current transaction state is ACTIVE or ABORTED, which in the embodiment of FIG. 1 is represented by the status bit 26. If it is ACTIVE, the instruction returns True, otherwise it returns False and invalidates the transactional entries. The ABORT instruction invalidates all transactional entries. The COMMIT, ABORT, and VALIDATE instructions all leave the transaction in the ACTIVE state. Notice that a transaction validates, commits, or aborts without communicating with the memory 12 or with other processors 13.

A straightforward implementation of a transactional memory may suffer from the problem of cyclic restart. By this is meant that a transaction P may abort transaction Q, and Q in turn may restart and abort P before it can finish, and so on. The following technique alleviates this problem. Each transaction P is given a number of "grace points" which allow it to execute for a fixed duration without being aborted by other transactions. If transaction Q tries to invalidate a cache entry of P, P can postpone Q's request if it has grace points left. Each time P postpones a request, it reduces its number of grace points by one. When P has used up its grace points, then it can no longer postpone such invalidations, and must abort. The issue is presented of how many grace points a transaction should have. An adaptive strategy can be used to determine the number. Each transaction starts with g grace points. Each time it is aborted by another transaction, it restarts with twice as many grace points, When it commits, it compares its current stock of grace points with g. If it has used up fewer than half its points, it starts the next transaction with g/2 grace points, otherwise it starts with g. Each time Q's invalidation is postponed, it waits for some duration, and then repeats the request. To avoid saturating the bus or network with repeated requests, Q should undertake an exponential backoff (doubling the pause after each unsuccessful request).

A transaction may abort even in the absence of conflicts with other transactions. For example, a transaction may never commit if it repeatedly runs longer than its scheduled quantum, or if it repeatedly accesses more memory locations than its cache can hold. Such coarse-grained transactions reflect an inappropriate use of transactional memory.

Transactions may also abort because of false sharing. Cache lines typically encompass more than one word, and logically unrelated variables may be mapped to the same cache line. For example, if P accesses variable p, and Q variable q, and if p and q are mapped to the same cache line, then one transaction may invalidate the other's cache entry, even though there is no logical conflict between them. It is believed that false sharing between transactions is unlikely to be a serious problem in practice, both because it is likely to be rare, and because it is likely to be transient. False sharing within a transaction is a more serious matter, since a transaction may continually abort itself. Such internal false sharing may be detectable by a static program analysis.

Finally, a transaction may abort because of cache set overflow. Most caches are not fully associative. Instead, the cache is implemented as a collection of small, full-associative memories called sets. Each address is mapped onto a particular set, perhaps by hashing. If a transaction's variables are laid out in such a way that the number of variables that map on to a particular set exceeds the set size, then that transaction might abort even if it runs in isolation. This problem should also be rare, and perhaps detectable by static analysis.

One way to avoid such problems is to provide a small transactional cache in addition to the regular cache. The transactional cache should be fully-associative with a line size of one. One possible scheme is the following. Both caches can hold transactional and non-transactional entries, but transactional entries would be placed in the regular cache only in the exceptional event that the transactional cache becomes full. Of course, the replacement algorithm for the transactional cache would evict non-transactional entries first. To cache an entry in exclusive mode in either cache may require invalidating an entry in the other.

An alternative embodiment has similarities to a so-called LimitLESS directory-based cache consistency scheme described by Chaiken et al, "LimitLESS directories: a scalable cache coherence scheme," Proc. 4th Int'l Conf. on Architectural support for Programming Languages and Operating Systems, pp. 224-234, ACM, April 1991. This scheme uses a fast, fixed-size hardware implementation for directories. If a directory overflows, the protocol traps into software, and the software emulates a larger directory. A similar approach is used in this embodiment to respond to cache set overflow. Whenever a cache is forced to evict a transactional entry, it traps into software and emulates a fully-associative cache with line size one. This approach has many of the same advantages as the original LimitLESS scheme: the common case is handled in hardware, and the exceptional case in software.

In the example of FIG. 1, only one transactional memory operation can be pending at CPU 10 at a given time. Now, there can be several transactional instructions ST or LT pending, as in the FIG. 3 example, but these just add to the read or write set, and all are terminated upon issuance of a COMMIT or ABORT. Thus, only one "transaction" is pending. When another process starts executing on a given CPU, usually cache lines with dirty bit set are written back and the cache is flushed, so this would abort any pending transaction. An alternative embodiment would allow a transaction to survive a process switch by providing a mechanism for saving the state of the transaction, but this would also require a mechanism for detecting any accesses to the locations in shared memory in the read and write sets, which could be implemented based on the directory model.

A Snoopy-Cache Protocol will now be described as an example of a detailed implementation of transactional memory for a bus-based architecture, generally as illustrated in FIG. 1. This scheme is based on a conventional "snoopy cache" scheme, such as that described by Goodman in Proc. 12th Int'l Symp. on Computer Arch., pp. 124–131, pub. by IEEE, June 1983. For simplicity, it is assumed the cache 15 is fully associative and has line size one, although changes necessary to accommodate different structures are discussed. It is also assumed the bus 11 allows processors to inhibit memory 12 from responding to bus requests, i.e., when a hit is detected by the snoop mechanism in response to a read request on the bus.

As described above, each entry is either transactional (TRANS) or non-transactional (TRANS). In addition to the transactional/non-transactional status, a cache entry has four states:

| Name | Meaning |
| --- | --- |
| INVALID | Nothing of interest (bit 21 not set) |
| VALID | Possible shared, not modified (bit 21 set). |
| DIRTY | In one cache only, modified (bit 20 set). |
| RESERVED | In one cache only, not modified (bit 20 not set) |

The following bus cycles on bus 11 initiated by the CPU 10 are used:

| Name | Meaning |
| --- | --- |
| READ | Read without acquiring ownership. |
| WRITE | Write back value, relinquish ownership. |
| RFO | Read, acquire ownership. |
| INV | Invalidate. |
| DATA(data) | Block Value. |

The ownership feature is implemented by having an "owned" bit associated with each cache line, in conventional manner.

Tables A through S referred to below are located in Appendix B.

A processor may have to do cache replacement before a LOAD, STORE, LT, or ST operation. If a cache entry is VALID or RESERVED, no action is necessary. If it is DIRTY and TRANS, then the processor issues a write cycle, and if it is TRANS, the processor sets its transaction state to ABORTED.

The operations in the snoopy-cache protocol will be described, then the bus cycles. A LT or ST instruction issued by an aborted transaction causes no bus cycles, has no effect on the cache, and the LT may return an arbitrary value. The Tables A and B describe how LT and ST behave when the transaction state is ACTIVE. In all cases, the final transaction state is ACTIVE. Notice that if an entry is dirty and non-transactional, then it must be written to memory to ensure that the dirty value is not lost if the transaction aborts.

A processor executing the ST instruction acquires an exclusive cached copy of its operand. If the processor already has a non-transactional dirty entry for that location, it is written back to ensure that value will not be lost if the transaction aborts. If a cache line encompasses multiple locations, then a transaction replacing an INVALID entry should issue a RFO bus cycle instead of the INV cycle shown below.

If a processor applies a LOAD to a dirty transactional entry or a STORE to any transactional entry, then the transaction state becomes ABORTED and the cache entry is invalidated. The Tables C and D describe how these operations behave for non-transactional entries.

If the cache line size exceeds a single word, then a cache in the INVALID state would issue a RFO instead of an INV in response to a STORE instruction.

If the COMMIT instruction succeeds, it simply marks all TRANS entries as TRANS, otherwise it marks them INVALID and TRANS. ABORT invalidates all TRANS entries, and VALIDATE checks the transaction state: if it is ACTIVE it returns True otherwise it returns False and invalidates all TRANS entries. All three operations leave the transaction state ACTIVE.

The manner in which the caches respond to bus cycles are described in Tables E, E and G.

When the memory observes a READ or RFO cycle, and if it is not inhibited from responding by a processor, then it responds with the value at that location. When it observes a DATA cycle, it updates that location.

Another example of an implementation according to an embodiment of the invention is a Directory Protocol. A directory-based cache consistency protocol is intended for a multiprocessor architecture where it is impractical for processors to communicate by broadcasts (i.e., no invalidates on the bus 11). How transactional memory can be implemented using a simple directory-based protocol will be described. This protocol is based loosely on Chaiken et al (cited above). For simplicity, it is assumed here that messages are delivered in the order they are sent, although the protocol can easily be adjusted to cope with out-of-order messages.

Each directory entry has a state and a set of pointers to caches, and each processor has a cache state and a transaction state. The SHARED-WAIT and EXCL-WAIT states are parameterized by an integer i that indicates the number of outstanding acknowledgments. Table H defines directory and cache, and Table I gives the messages used.

The CHECKP message is used to checkpoint the old (committed) value before ST makes a tentative change.

As before, a LT instruction issued when the transaction state is ABORTED will have no effect on the cache or transaction state, and may return an arbitrary value. The Table J describes how LT behaves when the transaction state is ACTIVE.

If a cache line encompasses multiple locations, then a transaction replacing an INVALID entry should send an XREQ message instead of the INV message shown in Table K.

As before, if a processor applies a LOAD to a dirty transactional entry or a STORE to any transactional entry, then the transaction is aborted and the cache entry is invalidated. The Tables L and M describe how these operations behave for non-transactional entries.

The COMMIT, ABORT, and VALIDATE instructions behave exactly as in the protocol of the previous example.

When a process receives BUSY in response to a SREQ or XREQ message, it simply retransmits. The DATA message arrives only in response to SREQ or XREQ.

The manner in which the caches respond to messages is described in Table N.

The Directory is defined in Tables O, P, Q, and R, where the shorthand "P→M" is used for "P sends m," and "M→P for "M is sent to P."

As shown in Table S, an UPDATE means either that the process is voluntarily giving up ownership perhaps due to a cache flush (first case), or it is giving up ownership in response to any INV message.

While the invention has been described with reference to specific embodiments, the description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments which fall within the true scope of the invention.

APPENDIX A

```
typedef struct {
        unsigned engs;
        unsigned degs;
        unsigned items [QUEUE_SIZE];
} queue
unsigned queue_deg(queue *q) {
        unsigned head, tail, result;
        while (1) {
             result = QUEUE_EMPTY;
             head = LTX(&q@>deqs);
             tail = LTX(&q@>enqs);
             if (VALIDATE()) {              /*  everything ok?      /*
                 if (head != tail) {        /*  queue not empty?    /*
result = LT(&q@>items[head % QUEUE_SIZE])   /*  read result         /*
ST(&q@>deqs, head + 1);                     /*  advance counter     /*
                 }
             if (Commit()) return result;
             }
        }
}
unsigned queue_enq(queue *q, unsigned value) {
        unsigned head, tail, result;
        while (1) {
             result = QUEUE_FULL;
             head = LTX(&q@>deqs);
             tail = LTX(&q@>enqs);
             if (VALIDATE()) {
                 if (tail - head < QUEUE_SIZE) {   /*  queue not full?   /*
ST(&q@>items[head % QUEUE_SIZE], value);          /*  insert value      /*
ST(&q@>enqs, tail + 1);                           /*  advance counter   /*
result = QUEUE_OK;                                /*  return code       /*
                 }
             if (Commit()) return result;
             }
        }
}
```

TABLE A

| | LT | | |
|---|---|---|---|
| Old Cache | Cycle | New Cache | Result |
| INVALID | READ | VALID & TRANS | DATA value |
| VALID & TRANS | none | VALID & TRANS | cache contents |
| VALID & TRANS | none | VALID & TRANS | cache contents |
| RESERVED & TRANS | none | RESERVED & TRANS | cache contents |

TABLE A-continued

| | LT | | |
|---|---|---|---|
| Old Cache | Cycle | New Cache | Result |
| RESERVED & TRANS | none | RESERVED & TRANS | cache contents |
| DIRTY & TRANS | WRITE | RESERVED & TRANS | cache contents |
| DIRTY & TRANS | none | DIRTY & TRANS | cache contents |

TABLE B

| | ST | |
|---|---|---|
| Old Cache | Cycle | New Cache |
| INVALID | INV | DIRTY & TRANS |
| VALID & TRANS | none | DIRTY & TRANS |
| VALID & TRANS | none | DIRTY & TRANS |
| RESERVED & TRANS | none | DIRTY & TRANS |
| RESERVED & TRANS | none | DIRTY & TRANS |
| DIRTY & TRANS | WRITE(data) | DIRTY & TRANS |
| DIRTY & TRANS | none | DIRTY & TRANS |

TABLE C

| | LOAD | | |
|---|---|---|---|
| Old Cache | Cycle | New Cache | Result |
| INVALID | READ | VALID | DATA value |
| VALID | none | VALID | cache contents |
| RESERVED | none | RESERVED | cache contents |
| DIRTY | none | DIRTY | cache contents |

TABLE D

| | STORE | |
|---|---|---|
| Old Cache | Cycle | New Cache |
| INVALID | INV | DIRTY |
| Valid | INV | DIRTY |

TABLE D-continued

| Old Cache | STORE Cycle | New Cache |
|---|---|---|
| RESERVED | none | DIRTY |
| DIRTY | none | DIRTY |

TABLE E

| Old Cache | READ Old Trans | Send | New Cache | New Trans |
|---|---|---|---|---|
| VALID & TRANS | any | DATA | unchanged | unchanged |
| VALID & TRANS | any | DATA | unchanged | unchanged |
| RESERVED & TRANS | any | DATA | VALID & TRANS | unchanged |
| RESERVED & TRANS | any | DATA | VALID & TRANS | unchanged |
| DIRTY & TRANS | any | DATA | VALID & TRANS | unchanged |
| DIRTY & TRANS | any | none | DIRTY & TRANS | ABORTED |

TABLE F

| Old Cache | RFO Old Trans | Send | New Cache | New Trans |
|---|---|---|---|---|
| VALID & TRANS | any | none | INVALID | unchanged |
| VALID & TRANS | any | none | INVALID | ABORTED |
| RESERVED & TRANS | any | DATA | INVALID | unchanged |
| RESERVED & TRANS | any | DATA | INVALID | ABORTED |
| DIRTY & TRANS | any | DATA | INVALID | unchanged |
| DIRTY & TRANS | any | none | DIRTY & TRANS | ABORTED |

TABLE G

| Old Cache | INV Old Trans | Send | New Cache | New Trans |
|---|---|---|---|---|
| any & TRANS | any | none | INVALID | unchanged |
| any & TRANS | any | none | INVALID | ABORTED |

TABLE H

| Component | State | Meaning |
|---|---|---|
| Directory | SHARED | Multiple read-only copies cached. |
|  | EXCLUSIVE | Single modifiable copy cached. |
|  | SHARED-WAIT(i) | Awaiting i acks to enter SHARED state. |
|  | EXCL-WAIT(i) | Awaiting i acks to enter EXCLUSIVE state. |
| Cache | INVALID | Not read or written. |
|  | VALID | Read but not written. |
|  | DIRTY | Written. |

TABLE I

| Type | Symbol | Name |
|---|---|---|
| Cache to Memory | SREQ | Request shared access. |
|  | XREQ | Request exclusive access. |
|  | CHECKP(data) | Write back block, keep ownership. |
|  | UPDATE(data) | Write back block, give up ownership. |
|  | ACKC | Give up ownership. |
| Memory to Cache | DATA(data) | Block value. |
|  | INV | Invalidate. |

TABLE I-continued

| Type | Symbol | Name |
|---|---|---|
|  | BUSY | Busy Signal. |

TABLE J

| Old Cache | LT Send | New Cache | Result |
|---|---|---|---|
| INVALID | SREQ | VALID & TRANS | DATA value |
| VALID & TRANS | none | VALID & TRANS | cached value |
| VALID & TRANS | none | VALID & TRANS | cached value |
| DIRTY & TRANS | CHECKP | VALID & TRANS | cached value |
| DIRTY & TRANS | none | DIRTY & TRANS | cached value |

TABLE K

| Old Cache | ST Send | New Cache |
|---|---|---|
| INVALID | INV | DIRTY & TRANS |
| VALID & TRANS | INV | DIRTY & TRANS |
| VALID & TRANS | INV | DIRTY & TRANS |
| DIRTY & TRANS | CHECKP | DIRTY & TRANS |
| DIRTY & TRANS | none | DIRTY & TRANS |

TABLE L

| Old Cache | LOAD Send | New Cache | Result |
|---|---|---|---|
| INVALID | SREQ | VALID | DATA value |
| VALID | none | SHARED | cached value |
| DIRTY | none | DIRTY | cached value |

TABLE M

| Old Cache | STORE Send | New Cache |
|---|---|---|
| INVALID | XREQ | DIRTY |
| VALID | XREQ | DIRTY |
| DIRTY | none | DIRTY |

TABLE N

| Old Cache | INV Old Trans | Send | New Cache | New Trans |
|---|---|---|---|---|
| INVALID | any | none | INVALID | unchanged |
| VALID & TRANS | any | ACKC | INVALID | unchanged |
| VALID & TRANS | any | ACKC | INVALID | ABORTED |
| DIRTY & TRANS | any | UPDATE | INVALID | unchanged |
| DIRTY & TRANS | any | none | INVALID | ABORTED |

TABLE O

| Old State | P → SREQ Old Pointers | Send | New State | New Pointers |
|---|---|---|---|---|
| SHARED | S | DATA → P | SHARED | S ∪ {P} |
| EXCLUSIVE | {Q} | INV → Q | SHARED-WAIT(1) | {P} |
| SHARED-WAIT(i) | {Q} | BUSY → P | SHARED-WAIT(i) | {Q} |
| EXCL-WAIT(i) | {Q} | BUSY → P | EXCL-WAIT(i) | {Q} |

TABLE P

| | | P → XREQ | | |
|---|---|---|---|---|
| Old State | Pointers | Send | New State | Pointers |
| SHARED | {P} | DATA → P | EXCLUSIVE | {P} |
| SHARED | S ≠ {P} | Q ∈ S − {P}, INV → Q | EXCL-WAIT (|S − {P}|) | {P} |
| EXCLUSIVE | {Q} | INV → Q | EXCL-WAIT(1) | {P} |
| SHARED-WAIT(i) | S | BUSY → P | SHARED-WAIT(i) | S |
| EXCL-WAIT(i) | S | BUSY → P | EXCL-WAIT(i) | S |

TABLE Q

| | | P → CHECKP | | | |
|---|---|---|---|---|---|
| Old State | Pointers | Send | New State | Pointers | Result |
| EXCLUSIVE | {P} | none | EXCLUSIVE | {P} | replaces value |

TABLE R

| | | P → UPDATE | | | |
|---|---|---|---|---|---|
| Old State | Pointers | Send | New State | Pointers | Result |
| EXCLUSIVE | {P} | none | SHARED | ∅ | replaces value |
| SHARED-WAIT(1) | {Q} | DATA → Q | SHARED | {Q} | replaces value |
| EXCL-WAIT(1) | {Q} | DATA → Q | EXCLUSIVE | {Q} | replaces value |

TABLE S

| | | P → ACKC | | |
|---|---|---|---|---|
| Old State | pointers | Send | New State | Pointers |
| SHARED-WAIT(1) | {Q} | DATA → Q | SHARED | {Q} |
| SHARED-WAIT (i > 1) | {Q} | none | SHARED-WAIT (i − 1) | {Q} |
| EXCL-WAIT(1) | {Q} | DATA → Q | EXCLUSIVE | {Q} |
| EXCL-WAIT (i > 1) | {Q} | DATA → Q | EXCL-WAIT (i − 1) | {Q} |

What is claimed is:

1. A method of operating a computer system having a CPU, local storage for said CPU, a shared memory, and at least one other processor accessing said shared memory, comprising the steps of:
   (a) initiating a memory operation by said CPU, including copying a data item that includes multiple words of selected non-contiguous locations in said shared memory to corresponding locations in said local storage, and setting an indication associated with said corresponding locations in said local storage to mark them as being inaccessible by said other processor;
   (b) performing an operation on said data item by said CPU to alter at least one or more parts of said data item in said corresponding location in said local storage;
   (c) monitoring said shared memory beginning at the time of said copying to detect any access to said data item in said shared memory by said other processor, and altering a status indicator if said other processor (1) reads a location in said shared memory corresponding to a part of said data item that has been altered, or (2) writes to a location in said shared memory corresponding to any part of said data item;
   (d) after said step of performing an operation, determining whether said status indicator has been altered, and, if not, changing said indication so that said corresponding locations in said local storage are accessible by said other processor, or, if so, discarding the content of said corresponding locations in said local storage and re-executing steps (a), (b), (c) and (d).

2. A method according to claim 1 wherein said step of copying includes loading said data item to said corresponding location.

3. A method according to claim 1 wherein said step of copying includes writing to said corresponding location.

4. A method according to claim 1 wherein said local storage is a cache and said corresponding locations are in one or more cache lines.

5. A method according to claim 4 wherein said indication is stored in a cache controller for said cache.

6. A method according to claim 4 wherein said status indicator is stored in a cache controller for said cache.

7. A method according to claim 4 wherein said step of monitoring is performed by a snoop mechanism in a cache controller for said cache.

8. A method according to claim 1 wherein the size of the data item is defined by a storage element accessible by said CPU.

9. A method according to claim 1 wherein said memory operation is not interleaved with any other transactional memory operation.

10. A method according to claim 9 wherein said memory operation is atomic in that the operation either completes through said step of changing said indication, or else has no effect on said other processor's access to said shared memory.

11. A computer system having a CPU, a local storage for said CPU, a shared memory, and at least one other processor accessing said shared memory, comprising:
   (a) means for initiating a memory operation by said CPU, including means for copying a data item that includes multiple words of selected non-contiguous locations in said shared memory into corresponding locations in said local storage, and means for setting an indication to mark said corresponding locations in said local storage as being inaccessible by said other processor;
   (b) means in said CPU performing an operation on said data item to alter at least one or more parts of said data item in said local storage;
   (c) means for monitoring said shared memory beginning at the time of said copying to detect any access to said data item in said shared memory by said other processor, and for altering a status indicator if said other processor (1) reads a location in said shared memory corresponding to a part of said data item that has been altered, or (2) writes to a location in said shared memory corresponding to any part of said data item;
   (d) means for determining, after said CPU performs said operation, whether said status indicator has been altered, and, if not, for changing said indication so that said corresponding locations in said local storage are accessible by said other processor, or, if so, for invalidating said corresponding locations in said local storage of said local storage and again initiating said memory operation.

12. A system according to claim 11 wherein the size of the data item is defined by a storage element accessible by said CPU.

13. A system according to claim 12 wherein said local storage is a cache and said corresponding locations are in one or more cache lines, and wherein said indication and said status indicator are each stored in a cache controller for said cache.

14. A system according to claim 13 wherein said means for monitoring includes a snoop mechanism in a cache controller for said cache.

15. A system according to claim 14 wherein said memory operation is not interleaved with any other transactional memory operation, and wherein said memory operation is atomic in that the operation either completes through said changing said indication, or else has no effect on said other processor's access to said shared memory.

16. A method of operating a computer system having a CPU, a cache for said CPU, a shared memory, and at least one other processor accessing said shared memory, comprising the steps of:
(a) initiating a transactional memory operation by said CPU, including loading a data item that includes multiple words of selected non-contiguous locations in of said shared memory into at least one line of said cache, and setting an indication for said at least one line of said cache to mark said at least one line as being unavailable for write-back to said shared memory;
(b) performing an operation on said data item by said CPU to alter at least one or more parts of said data item in said at least one line of said cache;
(c) monitoring said shared memory beginning at the time of said loading to detect any access to said data item in said shared memory by said other processor, and altering a status indicator if said other processor (1) reads a location in said shared memory corresponding to a part of said data item that has been altered, or (2) writes to a location in said shared memory corresponding to any part of said data item;
(d) after said step of performing an operation, determining whether said status indicator has been altered, and, if not, changing said indication so that said at least one line is available for write-back to said shared memory if accessed by said other processor, or, if so, invalidating said at least one line and re-executing steps (a), (b), (c) and (d).

17. A method according to claim 16 wherein the size of the data item is defined by a storage element accessible by said CPU and referenced by said step of monitoring.

18. A method according to claim 16 wherein said indication and said status indicator are stored in a cache controller for said cache.

19. A method according to claim 18 wherein said step of monitoring is performed by a snoop mechanism in said cache controller.

20. A method according to claim 16 wherein said transactional memory operation is not interleaved any other transactional memory operation.

21. A method according to claim 20 wherein said transactional memory operation is atomic in that the operation either completes through said step of changing said indication, or else has no effect on said other processor's access to said shared memory.

22. A method of managing access by multiple processors to memory shared by the processors, wherein each processor accesses the shared memory by performing steps comprising:
(a) copying multiple words from selected locations in the shared memory into cache lines in a cache memory, and setting first indicators corresponding to the cache lines to make the lines unavailable for write-back operations to the shared memory;
(b) performing an operation upon one or more cache lines to alter the contents of those lines;
(c) monitoring the shared memory beginning at step (a) to detect any access to the selected locations by other processors, and for each cache line, altering a second indicator if any other processor (1) reads from a location in shared memory whose contents were copied into a cache line that was altered, or (2) writes to a location in the shared memory whose contents were copied into a cache line;
(d) after step (b), determining whether the second indicator has been altered, and if not, changing the first indicator so that the cache lines are accessible by all processors, or if so, discarding the contents of the cache lines and re-executing steps (a), (b), (c) and (d).

23. The method of claim 22, wherein two or more of the multiple words are copied from non-contiguous locations in the shared memory.

24. The method of claim 22, further including a step of, for each cache line, altering a third indicator associated with that cache line in the event the contents of that line were altered by step (b).

25. The method of claim 24, wherein step (c) comprises steps of monitoring a memory bus associated with the shared memory to detect any access to the selected locations by other processors, and altering said second indicator if any other processor (1) reads a location in shared memory corresponding to a cache line whose third indicator has been altered, or (2) writes to a location in the shared memory corresponding to any of the cache lines.

26. The method of claim 24, wherein each third indicator comprises one or more bits in its corresponding cache line.

27. The method of claim 22, wherein each first indicator comprises one or more bits in its corresponding cache line.

28. The method of claim 22, wherein each second indicator comprises one or more status bits in the cache memory.

* * * * *